Figure 1:
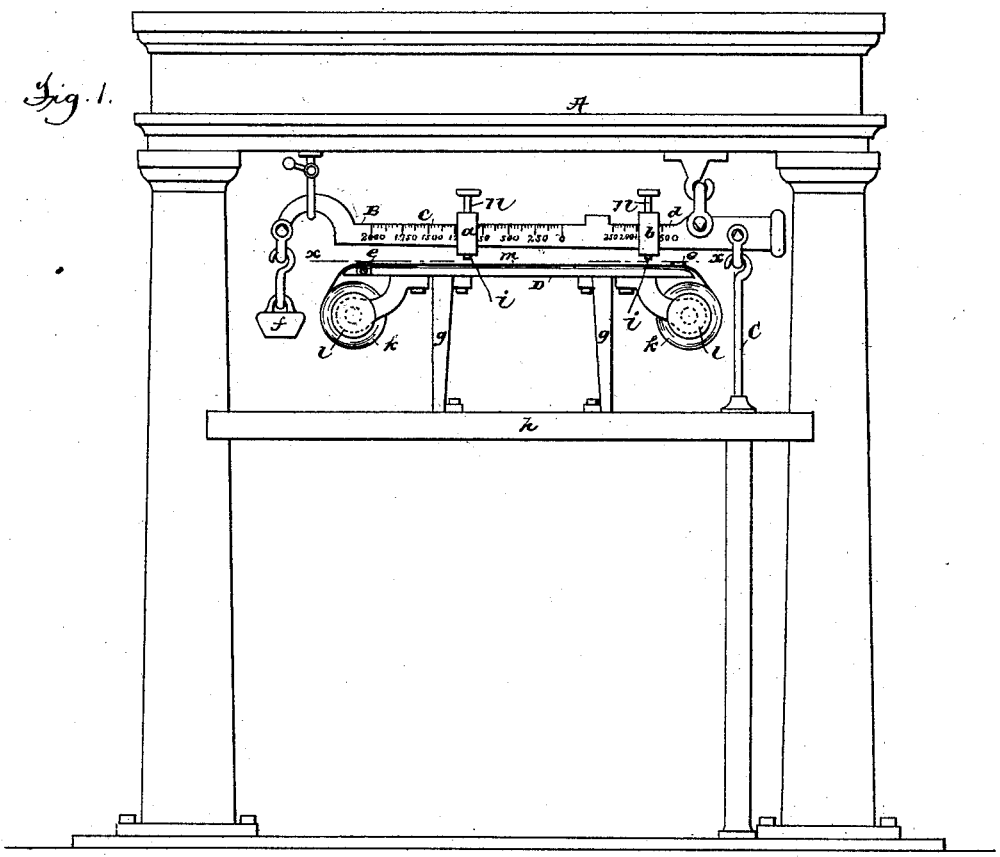

(No Model.) 2 Sheets—Sheet 1.

W. E. SELLECK.
RECORDING WEIGHING SCALE.

No. 378,557. Patented Feb. 28, 1888.

Attest:
Geo. H. Botts.
J. H. Hovey

Inventor:
William E. Selleck
by Munson & Philipp
Atty.

(No Model.) 2 Sheets—Sheet 2.
W. E. SELLECK.
RECORDING WEIGHING SCALE.
No. 378,557. Patented Feb. 28, 1888.
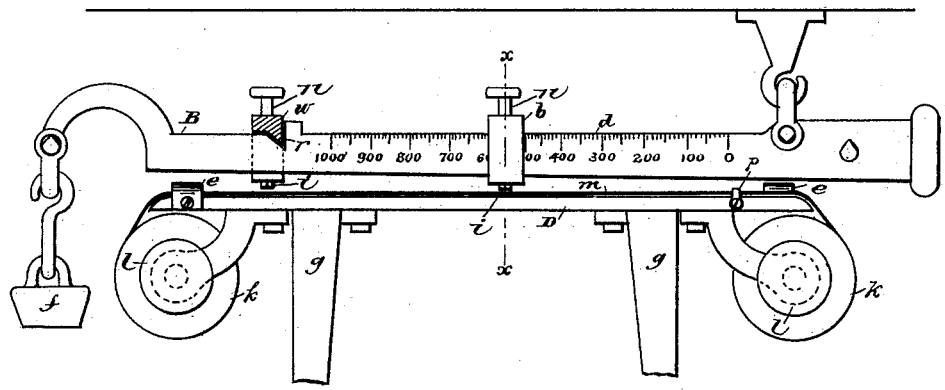
Fig. 5.
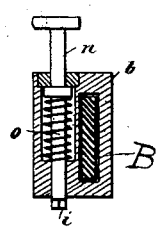
Fig. 3.
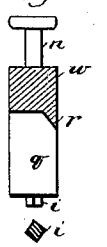
Fig. 7. Fig. 6.
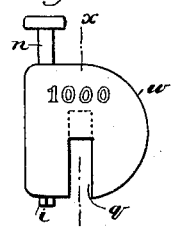
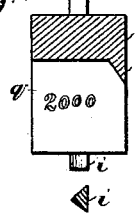
Fig. 8.
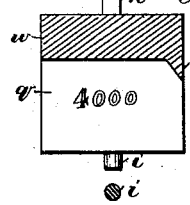
Fig. 9.
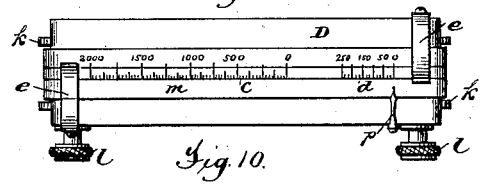
Fig. 4.
Fig. 10.
Attest:
Geo. H. Botts
J. L. Hovey
Inventor:
William E. Selleck
by
Numan & Philipp
Attys:
N. PETERS. Photo-Lithographer, Washington, D. C.

UNITED STATES PATENT OFFICE.

WILLIAM E. SELLECK, OF CHICAGO, ILLINOIS.

RECORDING WEIGHING-SCALE.

SPECIFICATION forming part of Letters Patent No. 378,557, dated February 28, 1888.

Application filed February 15, 1887. Serial No. 227,669. (No model.)

*To all whom it may concern:*

Be it known that I, WILLIAM E. SELLECK, a citizen of the United States, residing at Chicago, county of Cook, and State of Illinois, have invented certain new and useful Improvements in Scales, which are fully described and represented in the following specification and the accompanying drawings, forming a part of the same.

The improvements constituting the present invention are applicable to all classes of scales in which a graduated beam having a shifting poise is employed; but they are more especially designed for application to scales of the larger sizes which are used for weighing grain, coal, or other produce or merchandise in bulk or in large quantities, or which are designed for weighing wagons or railroad-cars and their contents.

In using these classes of scales it is of course necessary to keep a record of each reading of the scale, and for this purpose the weighing-master or the person having charge of the scale has a book in which he records the reading of the scale at each draft, together with other necessary data, and this record is used to compute the value of the produce or merchandise or the freight, or for whatever purpose it may be desired. It has been found in practice that with this system, however carefully administered, mistakes are liable to occur, which, when made, occasion great trouble and annoyance, and sometimes serious loss. In the hurry of rapid weighing even the most careful operator is liable to make a mistake in the reading of the scale; but he is still more liable to make a mistake in recording the reading by transposing some or all of the figures, and thus make a false entry after a correct reading. To overcome this difficulty, it is desirable that means should be provided by which the reading of the scale can be recorded mechanically, and thus avoid that liability to error and mistake incident to all mental operations.

The present invention relates to a means by which this result can be accomplished, and the improvements constituting the invention are applicable both to those scales in which the full capacity of the scale is indicated upon the beam and the entire weight indicated by the position or positions of one or more poises which is or are shifted along the beam, and to those scales in which removable counterpoise-weights are employed in addition to a poise or poises on the beam.

As a full understanding of the invention can be best given by an illustration and description of the manner in which it is applied and operates, all further preliminary description will be omitted and such a description given, reference being had to the accompanying drawings, in which—

Figure 2:
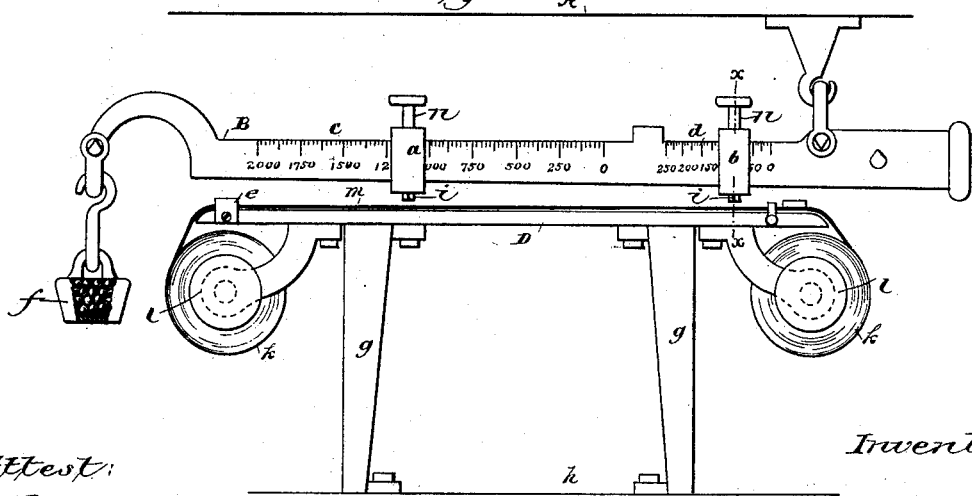

Figure 1 is a front elevation of an ordinary large-sized platform-scale, showing the improvements constituting the present invention applied thereto, the scale in this case being of the class in which the whole capacity of the scale is indicated on the beam. Fig. 2 is an enlarged side view of the scale-beam shown in Fig. 1 and the parts adjacent thereto. Fig. 3 is an enlarged vertical section of the poise, showing the beam in cross-section, the same being taken on the line $x\ x$ of Figs. 2 and 5. Fig. 4 is a plan view of the record-ribbon and its support, the view being taken on the line $x\ x$ of Fig. 1. Fig. 5 is a view similar to Fig. 2, showing the invention applied to a scale in which removable weights are used in connection with a poise or poises. Fig. 6 is an enlarged side view of one of the weights employed. Fig. 7 is a vertical section of the same, taken on the line $x\ x$ of Fig. 6. Figs. 8 and 9 are views similar to Fig. 7, showing weights of larger sizes; and Fig. 10 is an enlarged view of a portion of the record-ribbon, illustrating a feature which will be hereinafter explained.

Referring now particularly to Figs 1 to 4, it is to be understood that A represents the usual frame-work for supporting the beam; B, the beam, and C the rod connecting the beam with the levers beneath the scale-platform of an ordinary large-sized platform-scale. As shown in these figures, the beam B is graduated to indicate the full capacity of the scale, no counterpoise-weights being used. For this purpose the beam is provided with two poises, $a$ $b$, and two graduated scales, $c\ d$, over which the respective poises are arranged to be moved. The scale $d$, which is nearest the fulcrum of the beam, is graduated to indicate, in connection with the poise $b$, the weight from 0 to, say, 250 pounds, while the scale $c$ is graduated to indicate, in connection with the poise $a$, the weight from 0 to, say, 2,000 pounds.

The beam is or may be provided at its end with a small cup, as $f$, containing shot or something of a similar character, as seen in Fig. 2, the quantity of which can be changed from time to time to balance the scale.

Located beneath the beam B, and slightly below the lower ends of the poises $a\ b$, is a small table or platform, D, which is supported in any suitable manner, as by standards $g$, rising from a cross-piece, $h$, which extends between the main standards of the frame A.

Supported at the ends of the table D are a pair of reels or spools, $k$, having knobs or handles $l$, by which they can be conveniently turned, and upon which is wound a long band or ribbon of paper or other suitable material, $m$, which extends along and rests upon the top of the table D in such manner that it can readily be wound off from one of the reels $k$ and onto the other. The ribbon $m$ has printed upon it, so as to follow each other in succession along the whole length of the ribbon, a series of scales, $c\ d$, (see Fig. 4,) which correspond exactly in length and graduation to the scales $c\ d$ upon the beam B. The top of the table D may be covered with material, such as rubber, which is slightly yielding, and will also preferably be provided at or near its ends with light spring-clips, as $e$, which will press upon the ribbon $m$ sufficiently to hold it taut along the table.

Each of the poises $a\ b$ is provided with a vertical opening, through which passes a small rod, $n$, (see Fig. 3,) the lower end of which is provided with or made to form a marker, $i$, which may be a punch, cutter, pencil, or other suitable device. The rod $n$ is provided with a suitable spring, $o$, which is so arranged in any suitable manner that it will hold the rod in its elevated position, as shown, except when pressure is applied from above.

The manner of using the apparatus thus organized is as follows: When a weight is to be taken, the operator will, by turning one of the knobs $l$, move the ribbon along the table D until one of the pairs of printed scales $c\ d$ upon the ribbon are in the same relative positions to the markers carried by the poises that the index-points of the poises are to the scales $c\ d$ upon the beam. To enable the operator to readily determine when the ribbon has been moved to the right position, the table D may be provided with an index, $p$, as shown in Fig. 4. The poises $a\ b$ will then be moved along the beam until the weight is ascertained. The reading of the scale will then be taken and recorded in the usual manner, and before the position of the poises has been changed the operator will press or strike downward the rods $n$, so as to cause the markers $i$ upon the ends of the rods to mark the ribbon $m$, and the positions of the marks thus made on the ribbon will be exactly the same with relation to the scales $c\ d$ upon the ribbon as the position of the poises with relation to the scales upon the beam, and the reading of the scale will thus be recorded mechanically upon the ribbon, and can be referred to at any time to verify the record made by the operator in his book. The ribbon will then be moved along the table until the next pair of printed scales $c\ d$ are in proper position beneath the beam, and the operation will be repeated.

It will usually be found most desirable to have the ribbon $m$ continuous and wound upon reels and advanced in the manner just described; but this is not essential. It may be in short lengths or pieces, each piece containing one fac-simile of the scale or scales upon the beam; or when the ribbon is prepared in a long strip it may be advanced in other ways, and as each record is made the piece of the ribbon containing the record may be torn off, instead of being wound onto the reel.

The particular form of the scale-beam shown in Figs. 1 and 2 has been selected merely for the purpose of illustration. In some cases the scale-beam may have only a single poise and in some cases it may have more than two, and the invention can be applied equally well to those scales having two or more beams. In any case the scale or scales printed upon the ribbon will correspond to the scale or scales upon the beam, and each of the poises will be provided with a marking-instrument of some kind. The form of this marking-instrument is not, however, essential, and may be varied widely without departing from the invention.

Referring now to Figs. 5 to 9, the manner of applying the invention to those scales in which removable weights are employed will be explained. As illustrated in these figures, the scale-beam is provided with only a single movable poise; but this is not material. It may be provided with a plurality of poises, as in the case first described. The removable weights $w$, instead of being suspended from the end of the beam, as in the common organizations, are constructed so as to be placed upon the end of the beam. For this purpose the weights are provided with slots $q$, so as to straddle the beam, and the slots $q$ are provided at their inner or upper ends with lips or knife-edges $r$, which fit into a corresponding notch in the beam, as shown in Fig. 5. Each of the weights is provided with an opening, through which passes a rod, $n$, having at its lower end a marking-instrument, $i$, which is arranged and operates in the same manner as the rod and marker of the poise. The markers $i$ of the different-sized weights are of different shape or possess some distinguishing feature, the marker for a one-thousand-pound weight being of diamond form, for example, as shown in Fig. 7; that for a two-thousand-pound weight of triangular form, as shown in Fig. 8, and that for a four-thousand-pound weight of round form, as shown in Fig. 9, and so on.

The manner of using the apparatus when thus organized is substantially the same as already described. The ribbon $m$ having been advanced so as to bring the scale printed upon it into proper position, the proper weight $w$ will be selected and placed upon the end of the beam and the poise will be adjusted until the weight is indicated. The reading will then be taken and the rods $n$ depressed, so as to cause the markers $i$ to mark the ribbon $m$. The mark made by the marker of the poise will indicate the position of the poise by the scale on the ribbon, the same as already described, and the mark made by the marker of the weight $w$ will, by its form or other peculiarity, indicate the size or denomination of the weight.

In some cases the beams of scales are graduated to indicate the weight in bushels or other unit of measure instead of pounds. In such case the ribbon $m$ will of course be printed to correspond. In some cases it may be desirable to have the reduction of the weight in pounds to bushels or other unit appear upon the ribbon, and this can of course be readily provided for, when desired, by printing the additional matter upon the ribbon, as indicated in Fig. 10.

What I claim is—

1. The combination, with a scale-beam and its poise, having a marker, of a removable weight, $w$, slotted to straddle the beam, also having a marker, the lip $r$, a notch for holding the weight $w$ in place, and a ribbon or sheet provided with a graduation similar or corresponding to that upon the beam and arranged adjacent to the beam and in position to be acted on by said markers, substantially as described.

2. A series or set of removable weights of different sizes for a scale-beam, each weight being slotted to straddle the beam, and provided with a marker and with means for holding it in a fixed position upon the beam, the markers being of different shape or character, so as to indicate the different weights, substantially as described.

3. The combination, with a scale-beam and its poise or poises, each provided with a marker, of the table D, the ribbon $m$, provided with graduations similar or corresponding to the graduations upon the beam, and the spools $k$ for containing and advancing said ribbon along said table, substantially as described.

In testimony whereof I have hereunto set my hand in the presence of two subscribing witnesses.

WILLIAM E. SELLECK.

Witnesses:
J. A. HOVEY,
T. H. PALMER.